US012513249B2

(12) United States Patent
Törnkvist

(10) Patent No.: US 12,513,249 B2
(45) Date of Patent: Dec. 30, 2025

(54) SHARED REFERENCE FOR A CHARGING DATA RESOURCE FOR PDU SESSIONS IN COMMUNICATIONS SYSTEM

(71) Applicant: Telefonaktiebolaget LM Ericsson (publ), Stockholm (SE)

(72) Inventor: Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/918,005

(22) PCT Filed: Apr. 14, 2020

(86) PCT No.: PCT/SE2020/050383
§ 371 (c)(1),
(2) Date: Oct. 10, 2022

(87) PCT Pub. No.: WO2021/211023
PCT Pub. Date: Oct. 21, 2021

(65) Prior Publication Data
US 2023/0141872 A1 May 11, 2023

(51) Int. Cl.
*H04W 76/10* (2018.01)
*H04M 15/00* (2006.01)
(Continued)

(52) U.S. Cl.
CPC ......... *H04M 15/8228* (2013.01); *H04W 4/24* (2013.01); *H04W 60/06* (2013.01); *H04W 76/10* (2018.02)

(58) Field of Classification Search
CPC ............. H04M 15/8228; H04M 15/44; H04M 15/62; H04M 15/66; H04M 15/83;
(Continued)

(56) References Cited

U.S. PATENT DOCUMENTS 11,468,425 B1 * 10/2022 Suthar ................... G06Q 20/24
11,770,267 B2 * 9/2023 Yan ......................... H04W 4/24
370/329
12,143,452 B2 * 11/2024 He ....................... H04L 12/1407
2015/0229779 A1 8/2015 Goermer et al.
(Continued)

FOREIGN PATENT DOCUMENTS

CN 101150782 B 4/2012
EP 3346734 A1 7/2018
WO WO 2020/029729 A1 2/2020

OTHER PUBLICATIONS

International Search Report and Written Opinion of the International Searching Authority, PCT/SE2020/050383, mailed Feb. 24, 2021, 11 pages.
(Continued)

Primary Examiner — Khawar Iqbal
(74) Attorney, Agent, or Firm — Sage Patent Group

(57) ABSTRACT

An AMF of a communications system responds to receipt of a network attach request message of a UE requesting attachment to a network of the communication system, by sending a charging data request message toward a CHF containing a notification for the CHF to keep a charging data resource to track charging for network resources used for communications associated with UE while attached to the network. The AMF receives a response message of the CHF containing a reference for the charging data resource associated with the UE while attached to the network. The AMF responds to receiving a PDU session establishment request message of the UE, by sending a PDU session establishment request message containing the reference for the charging data resource toward a SMF. Related SMF and CHF of the communications system are disclosed.

18 Claims, 6 Drawing Sheets

(51) Int. Cl.
*H04W 4/24* (2024.01)
*H04W 60/06* (2009.01)

(58) Field of Classification Search
CPC ....... H04W 76/10; H04W 4/24; H04W 60/06; H04W 8/02; H04W 92/24; H04L 12/14
See application file for complete search history.

(56) References Cited

U.S. PATENT DOCUMENTS

| | | | |
|---|---|---|---|
| 2017/0332312 A1 | 11/2017 | Jung et al. | |
| 2019/0274025 A1 | 9/2019 | Lindholm et al. | |
| 2020/0028973 A1 | 1/2020 | Livanos et al. | |
| 2020/0092423 A1* | 3/2020 | Qiao | H04W 80/10 |
| 2020/0304408 A1* | 9/2020 | Suthar | H04L 67/141 |
| 2021/0112406 A1* | 4/2021 | Jiang | H04W 12/02 |
| 2021/0234965 A1* | 7/2021 | Kaki | H04M 15/00 |
| 2023/0122010 A1* | 4/2023 | Qiao | B60L 53/65 |
| | | | 320/109 |
| 2024/0179774 A1* | 5/2024 | Qiao | H04W 76/12 |
| 2025/0119964 A1* | 4/2025 | Qiao | H04W 76/15 |

OTHER PUBLICATIONS

3rd Generation Partnership Project; Technical Specification Group Services and System Aspects; Telecommunication management; Charging management; 5G data connectivity domain charging; stage 2 (Release 16), 3GPP TS 32.255 V16.4.0 (Mar. 2020) 101 pages.
3rd Generation Partnership Project; Technical Specification Group Services and System Aspects; Charging management; 5G connection and mobility domain charging; stage 2 (Release 16) 3GPP TS 32.256 V16.0.0 (Dec. 2019) 51 pages.
3rd Generation Partnership Project; Technical Specification Group Services and System Aspects; Telecommunication management; Charging management; 5G Data connectivity domain charging; stage 2 (Release 15) (pp. 21-23) 3GPP TS 32.255 V1.0.0 (Jun. 2018) 42 pages.
3rd Generation Partnership Project; Technical Specification Group Services and System Aspects; Study on system enhancement for Proximity based Services (ProSe) in the 5G System (5GS) (Release 17) (pp. 48-51) 3GPP TR 23.752 V0.3.0 (Jan. 2020) 73 pages.
Extended European Search Report, European Patent Application No. 20930700.8, mailed May 8, 2023, 16 pages.
3rd Generation Partnership Project; Technical Specification Group Services and System Aspects; Telecommunication management; Charging management; 5G system, charging service; stage 3 (Release 15) 3GPP TS 32.291 V1 .0.0 (Sep. 2018) 59 pages.
"PCR TS 32.291 Proposal on Message flow of the Service Operation," 3GPP TSG SA WGS (Telecom Management) Meeting #119Ad-Hoc, Jun. 26-28, 2018, Stockholm (Sweden) S5-184045, 3 pages.

\* cited by examiner

SHARED REFERENCE FOR A CHARGING DATA RESOURCE FOR PDU SESSIONS IN COMMUNICATIONS SYSTEM

CROSS REFERENCE TO RELATED APPLICATIONS

This application is a 35 U.S.C. § 371 national stage application of PCT International Application No. PCT/SE2020/050383 filed on Apr. 14, 2020, the disclosure and content of which is incorporated by reference herein in its entirety.

TECHNICAL FIELD

The present disclosure relates to communications among user equipments, access management functions, session management functions, and charging functions for charging related to PDU sessions.

BACKGROUND

In the current network resource charging specified by the 3rd Generation Partnership Project (3GPP) each Network Function performs charging by initiating a new charging request for a specific user equipment (UE), usually defined by an International Mobile Subscriber Identity (IMSI). For instance, if charging for a UE attachment to a network is wanted, an Access Management Function (AMF) will trigger a charging event through a Charging Function (CHF) for the IMSI that is included in the attach message, and later if charging for data transmission is wanted a Session Management Function (SMF) will setup its own charging for this with the CHF.

Charging identifiers for resources used for PDU sessions with the UE are post processed to correlate the events for charging purposes. PCT patent application WO 02/37870 (corresponding to U.S. Pat. No. 7,391,854) discloses a mechanism for coordinating charging for a multimedia session between a UE and a remote host on both an application/session level and on an IP/access bearer level. A token associated with the multimedia session is generated and used to correlate session charges for operations performed in the packet-switched access network and for operations performed in the multimedia system.

When an operator would like to have all parts for the service delivery consolidated, independent of the node or function producing the information, it requires that first all charging information events are sorted and correlated. It is difficult or sometimes not possible for the system to know if all parts of the service delivery have been found, i.e. how to determine which functions and nodes have been part of the service delivery. One approach is to sort and correlate all charging information events based on the UE and the time of events, but the events can only be consolidated through post processing by a system. The system cannot provide the operator more real-time information since the information requires a lot of processing to find the entity handling the charging and/or to correlate the information in order. For these types of scenarios and because of the substantial number of steps needed to process and put all information together makes the event information inaccessible in real-time or near real-time.

SUMMARY

Some embodiments of the present disclosure are directed to a method by an AMF of a communications system. The method includes responding to receipt of a network attach request message of a UE requesting attachment to a network of the communication system, by sending a charging data request message toward a CHF containing a notification for the CHF to keep a charging data resource to track charging for network resources used for communications associated with UE while attached to the network. The method receives a response message of the CHF containing a reference for the charging data resource associated with the UE while attached to the network. The method responds to receiving a protocol data unit (PDU) session establishment request message of the UE, by sending a PDU session establishment request message containing the reference for the charging data resource toward a SMF.

Some other related embodiments are directed to a method by a CHF of a communications system. The method includes responding to receipt of a charging data request message of a UE requesting attachment to a network of the communication system and containing a notification for the CHF to keep a charging data resource to track charging for network resources used for communications while the UE is attached to the network, by sending a response message containing a reference for the charging data resource. The method responds to receipt of a charging data request message for a PDU session requested by the UE, by sending a charging data response message. The method tracks charging for network resources used for communications during the PDU session with the UE using the reference for the charging data resource.

Some other related embodiments are directed to a method by a SMF of a communications system. The method includes responding to receipt of a PDU session establishment request message related to a UE requesting attachment to a network of the communications system and that contains a reference for a charging data resource associated with the UE while attached to the network, by sending toward a CHF a charging data request message for the PDU session that contains the reference for the charging data resource and by starting a charging session for the PDU session using the reference. The method responds to receiving a charging data response message of the CHF, by communicating with an AMF to establish the PDU session for the UE.

Other further related embodiments are directed to AMF, CHF, and SMF apparatuses.

In some of these embodiments, an AMF of a communications system includes at least one processor, and at least one memory coupled to the at least one processor and including computer readable program code that when executed by the at least one processor causes the at least one processor to perform operations. The operations are configured to respond to receipt of a network attach request message of a UE requesting attachment to a network of the communication system, by sending a charging data request message toward a CHF containing a notification for the CHF to keep a charging data resource to track charging for network resources used for communications associated with UE while attached to the network. The operations are further configured to receive a response message of the CHF containing a reference for the charging data resource associated with the UE while attached to the network. The operations are further configured to respond to receipt of a PDU session establishment request message of the UE, by sending a PDU session establishment request message containing the reference for the charging data resource toward a SMF.

In some of these embodiments, a CHF of a communications system includes at least one processor, and at least one memory coupled to the at least one processor and including computer readable program code that when executed by the at least one processor causes the at least one processor to perform operations. The operations are configured to respond to receiving a charging data request message of a UE request attachment to a network of the communication system and containing a notification for the CHF to keep a charging data resource to track charging for network resources used for communications while the UE is attached to the network, by sending a response message containing a reference for the charging data resource. The operations are further configured to respond to receipt of a charging data request message for a PDU session requested by the UE by sending a charging data response message. The operations are further configured to track charging for network resources used for communications during the PDU session with the UE using the reference for the charging data resource.

In some of these embodiments, a SMF of a communications system includes at least one processor, and at least one memory coupled to the at least one processor and including computer readable program code that when executed by the at least one processor causes the at least one processor to perform operations. The operations are configured to respond to receipt of a PDU session establishment request message related to a UE requesting attachment to a network of the communications system and that contains a reference for a charging data resource associated with the UE while attached to the network, by sending toward a CHF a charging data request message for the PDU session that contains the reference for the charging data resource and by starting a charging session for the PDU session using the reference. The operations are further configured to respond to receipt of a charging data response message of the CHF, by communicating with an AMF to establish the PDU session for the UE.

Potential advantages of these and other embodiments disclosed herein include that the AMF shares the reference for the charging data resource with the SMF by including it as content in its message, and the SMF can correspondingly share the reference with the CHF by including it as content in its message. In this manner, the CHF can operate to add the charging for the PDU session resource utilization to the reference that was shared by the AMF. Because the same reference can thereby be used for one or more PDU sessions established with the UE, a charging function or billing function can directly determine all resource charging for the UE using the shared reference. This avoids the need to perform post processing operations and enables more real-time management based on all charging associated with the shared reference.

It is noted that aspects described with respect to one embodiment may be incorporated in different embodiments although not specifically described relative thereto. That is, all embodiments and/or features of any embodiments can be combined in any way and/or combination. Moreover, other AMFs, CHFs, and SMFs, and corresponding methods and computer program products according to embodiments will be or become apparent to one with skill in the art upon review of the following drawings and detailed description. It is intended that all such other AMFs, CHFs, and SMFs, and corresponding methods and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
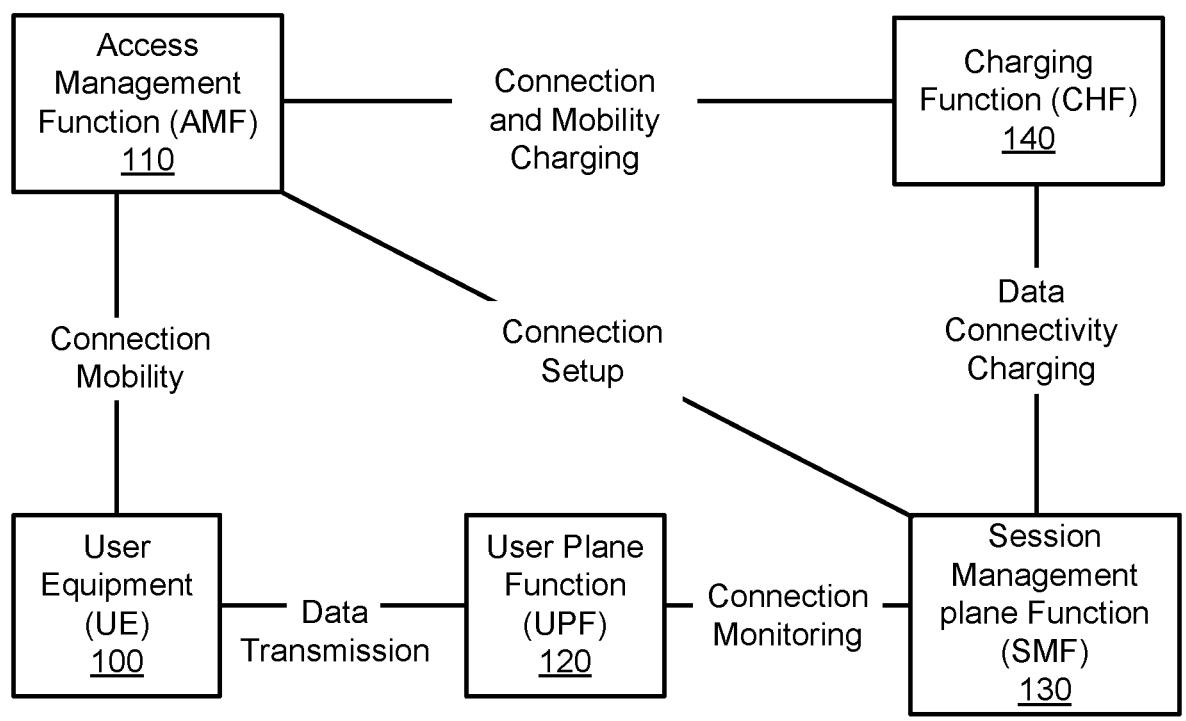
FIG. 1 is a block diagram of a communications system having functions configured in accordance with some embodiments of the present disclosure.

FIG. 1 is a block diagram of a communications system having functions configured in accordance with some embodiments of the present disclosure. Referring to FIG. 1, the communication system includes a user equipment (UE) 100, an access management function (AMF) 110, a user plane function (UPF) 120, a session management plane function (SMF) 130, and a charging function (CHF) 140. The AMF 110, UPF 120, SMF 130, and CHF 140 may be part of the 5G Core Network (5GC).

Figure 2:
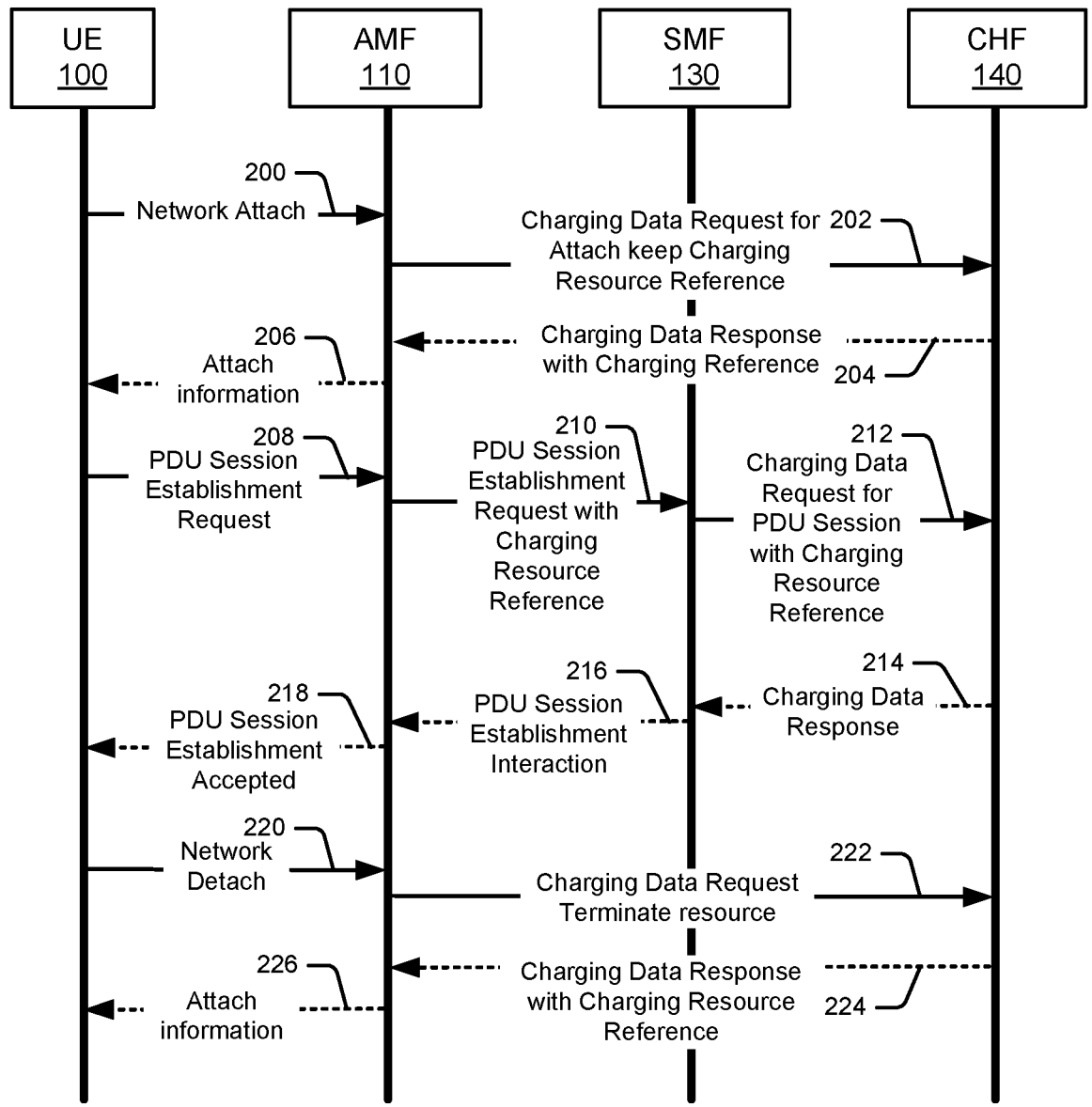
FIG. 2 is a combined data flow diagram and flowchart illustrating a sequence of operations and data flows between functions of the communications system of FIG. 1 for UE network attach procedures, PDU session establishment, and UE network detach procedures and use of a shared reference for a charging data resource associated with the UE in accordance with some embodiments of the present disclosure.

Example operations performed by the nodes of the communications system of FIG. 1 are now explained in the context of the steps shown in FIG. 2 in accordance with some embodiments of the present disclosure.

FIG. 2 is a combined data flow diagram and flowchart illustrating a sequence of operations and data flows between functions of the communications system of FIG. 1 for UE network attach procedures, PDU session establishment, and UE network detach procedures and use of a shared reference for a charging data resource associated with the UE in accordance with some embodiments of the present disclosure. Although various arrows are used to convey example communication directions, the illustrated arrows are not limiting and the communications can occur in the opposite directions to those illustrated and often occur in both directions. Moreover, the communications can occur through intermediary network functions other than those shown.

Referring to FIG. 2, in step 200, the UE 100, which can be identified by an International Mobile Subscriber Identity (IMSI), sends an attachment request message containing the IMSI which is passed to the AMF 110 to initiate a network attach operation. Although not shown, the UE 100 communicates with the AMF 110 via a radio access network, which may be a NG-RAN (Next Generation Radio Access Network).

The CHF 140 is responsible for converged online charging and offline charging functionalities, and provides quota, re-authorization triggers, rating conditions and is notified about usage reports from the SMF 130. In step 202, the AMF 110 responsively sends a charging data request message toward the CHF 140 which contains a notification for the CHF 140 to keep a charging data resource to track charging for network resources used for communications associated with UE 100 while the UE 100 is attached to the network. The charging data resource can be REST based and created to provide service to the AMF 110 for tracking charging data until further notice (e.g., terminate resource notice) is received from the AMF 110. Thus, the CHF 140 of FIGS. 1 and 2 is requested by the AMF 110 to keep the charging data resource active for tracking and accumulating charging for use of network resources for the UE while the UE remains attached the network. The CHF responds to charging messages which reference the charging data resource by accumulating those charges under the charging data resource. The charging data resource may, for example, include a record structure in which charging messages cause corresponding charging entries to be added to the record structure. These operations are in sharp contrast to prior existing AMF and CHF operations, whereby the CHF would create a charging data resource, report a charge for the charging data resource to a billing system, and then close the charging data resource.

In step 204, the CHF 140 creates the charging data resource which can include as part of REST the CHF 140 creating a database entry where charging data is stored for the UE 100 (e.g., stored with an associated to the UE IMSI). The CHF 140 then responds to the AMF 110 by sending 204 a charging data response containing a reference for the charging data resource associated with the UE 100 while attached. The reference for the charging data resource is also referred to as a "charging resource reference" and "reference" for brevity. In practice, the reference can be a Uniform Resource Identifier (URI) that includes of a string of characters that unambiguously identifies a particular charging data resource record at the CHF 140 which is used to track charging for network resources used for communications (e.g., Protocol Data Unit (PDU) session(s)) with the UE 100.

In step 206, the AMF 110 stores the reference for the charging data resource in a local memory of the AMF 110 or connected memory (e.g., User Data Repository) with a persistent association to the UE 100 (e.g., identified by IMSI), and sends network attach information in a message passed to the UE 100. The UE 100 uses the network attach information to complete attachment to the network.

Although the UE 100 would not normally be notified of the reference for the charging data resources, in some embodiments the reference may be included in the message communicated in step 206 with the attach information. Informing the UE 100 of the resource may be useful in proximity services for the UE 100. Proximity services (ProSe) provides mechanisms for UEs to discover other UEs in close proximity and to communicate with those other UEs directly, such as without the data path being routed via the network infrastructure. For example, a public safety officer can use ProSe services to discover local presence of another public safety officer and communicate (transmit user plane traffic) directly therebetween.

In step 208, awhile later, the UE 100 requests establishment of a PDU session by sending a PDU session establishment request message, which is passed to the AMF 110, that contains the reference for the charging data resource. For 5G session management, the SMF 130 is primarily responsible for interacting with the decoupled data plane, creating updating and removing Protocol Data Unit (PDU) sessions and managing session context with the UPF 120. Both the UE 100 and a radio access network (e.g., gNB) may employ the Next Generation Application Protocol (NGAP) to carry Non Access Stratum (NAS) messages across the N1 or N2 reference interfaces in order to request a new PDU session. The AMF 110 receives these requests and handles connectivity and/or mobility management while forwarding session management requirements over the N11 interface to the SMF 130. The AMF 110 determines which SMF 130 is best suited to handle a connection request by querying a Network Repository Function (NRF).

Messages received over the N11 interface represent a trigger to add, modify or delete a PDU session across the user plane. The SMF 130 sends messages to the UPF 120 over the N4 reference interface using the Packet Forwarding Control Protocol (PFCP). During session establishment or modification, the SMF 130 also interacts with a Policy Control Function (PCF) over the N7 interface and the subscriber profile information stored within the Unified Data Management (UDM) function (N10), which assumes the role previously performed by the Home subscriber Server (HSS).

In the illustrative example of FIG. 2, the AMF 110 retrieves from its local memory or connected memory (e.g., User Data Repository) the reference for the charging data resource which is associated with the UE 100 (e.g., identified by IMSI), and sends (step 210) an instruction message, which is passed to the SMF 130, to establish the PDU session and includes the retrieved reference for the charging data resource in the instruction message. It is noted that the UE 100 can have multiple simultaneously ongoing PDU sessions and/or can have a series of spaced apart in time PDU sessions while the UE remains attached to the network. Moreover, any two or more of these PDU sessions may extend through different SMFs within the communications system architecture. Thus, by the AMF 110 providing each of the SMFs the reference for the charging data resource during establishment of respective PDU sessions, each of the SMFs are thereby able to use that shared reference to perform charging by the CHF 140 so that network resources used for those PDU sessions are all charged to the same shared reference.

In step 212, the SMF 130 starts a charging data request by operations that include sending toward the CHF 140 a charging data request message for the PDU session, where the charging data request message contains the reference for the charging data resource that was received from the AMF 110. The CHF 140 responsively adds the PDU session charging to the reference for the charging data resource. Thus, instead of creating a new reference for the PDU session, the CHF 140 uses the earlier reference sent to the AMF 110 (step 204) to track additional resource charging for the PDU session for the UE 100 (e.g., identified by IMSI). The CHF 140 adds other previous or subsequent charging for the UE 100 that arises from other PDU sessions and/or other network resource(s) utilization by the UE 100 to the same resource for the charging data resource while the UE 100 remains attached to the network.

Accordingly, the AMF 110 shares the reference with the SMF 130 by including it as content in the message of step 210, and the SMF 130 correspondingly shares the reference with the CHF 130 by including it as content in the message of step 212. In this manner, the CHF 140 can operate to add the charging for the PDU session resource utilization to the reference that was shared by the AMF 110. Because the same reference is thereby used for one or more PDU sessions established with the UE 100, a charging function or billing function can directly determine all resource charging for the UE 100 which is associated with the shared reference. This avoids the need to perform post processing operations described above in the context of previously existing systems and enables more real-time management based on the charging made for the shared reference.

In step 214, the CHF 140 sends a charging data response message, which is passed to the SMF 130, confirming the start of the charging data session for the PDU session of the UE 100. The CHF 140 charges for use of the network resource(s) by the UE during the PDU session. As noted above, the UE 100 can have multiple simultaneously ongoing PDU sessions and/or can have a series of spaced apart in time PDU sessions while the UE remains attached to the network. The CHF 140 is configured to use the same reference for the charging data resource to track charging for network resources used for communications during the one or more PDU sessions. By receiving the reference in each of the charging data request messages for each of the PDU sessions, the CHF 140 is thereby able to charge to the same reference.

In step 216, the SMF 130 receives the charging data response message of the CHF 140 and responsively continues its interaction with the AMF 110 for the PDU session establishment, including sending a PDU session establishment message passed to the AMF 110. In step 218, the AMF 110 responsively interacts with the UE 100 for the PDU session establishment, including sending a PDU session establishment accepted message passed to the UE 100.

The charging data response message sent in step 214 and the PDU session establishing message sent in step 216 may contain the reference for the charging data resource. When the CHF 140 includes the reference in the charging data response message, this enables the AMF 110 and/or the SMF 130 to confirm that the CHF 140 is capable of using the reference provided by the AMF 110, via the SMF 130, for the PDU session that is being established for the UE 100 and, otherwise if not included by the CHF 140, the AMF 110 and/or the SMF 130 can resort to a process for generating a new reference for charging resources used for the PDU session. Inclusion of the reference in the charging data response message can alternatively or additionally enable the SMF 130 to operate more stateless by not requiring the SMF 130 to maintain a mapping between the charging data request sent in step 212 and the confirmatory charging data response received in step 214. Inclusion of the reference in the charging data response message may alternatively or additionally provide another way for the SMF 130 and/or the AMF 110 to match the response from the CHF 140 to the PDU session being established for the UE 100, which can increase reliability of the charge tracking operations.

In step 220, awhile later after the UE 100 has transmitted and received data while the PDU session remains established, the UE 100 requests detachment from the network, including by transmitting a network detach request message passed to the AMF 110.

In step 222, the AMF 110 responsively creates a charging data request message requesting termination of resource for the network disconnection, and associated termination of the reference for the charging data resource. The charging data request message is passed to the CHF 140 to request the CHF 140 to archive the (REST based) resource that has been used for the UE 100 (e.g., identified by IMSI). The AMF 110 retrieves the reference for the charging data resource from its local memory or connected memory (e.g., User Data Repository), such as using the identifier of the UE 100 (e.g., the IMSI) as a lookup pointer, and includes the reference in the charging data request message.

In step 224, the CHF 140 responsively closes the resource and sends a charging data response message, which may include the reference, which is passed to the AMF 110. The AMF 110 responsively sends in step 226 an attach information message used by the UE 100 to detach from the network. The CHF 140 operation to close the resource may include removing or otherwise updating its database entries associated with the received reference for the charging data resource, and sending a message to a billing system (billing functional node) of the communications network that contains billing information generated based on the entries from the CHF 140 database that were or continue to be associated with the reference for the charging data resource. The CHF 140 can operate to close the resource of the reference for the charging data resource. Although detachment of the UE 100 from the network would normally herein cause the CHF 140 to close the resource, such that a subsequent network attachment operation (e.g., steps 200-206) would trigger the CHF 140 to generate a new reference, in some other embodiments the CHF 140 keeps the reference active in its database associated with the UE 100 (e.g., IMSI) for future reuse for charging for network resource utilization associated when the UE 100 again reattaches to the network and initiates future PDU session(s).

The charging data response message sent in step 224 may contain the reference for the charging data resource. When the CHF 140 includes the reference in the charging data response message, this enables the AMF 110 to operate more stateless by not requiring the AMF 110 to maintain in local memory or connected memory (e.g., User Data Repository) information providing a mapping between the reference included in the charging data request sent in step 222 and the confirmatory charging data response that is subsequently received in step 224.

One or more of the messages communicated to the CHF 140 may be based on Nchf_ConvergedCharging_Create/ Update/Release. One or more of the messages communicated to the SM 130 may be based on Nsmf_PDUSession_ Create/Modify/Release.

Figure 3:
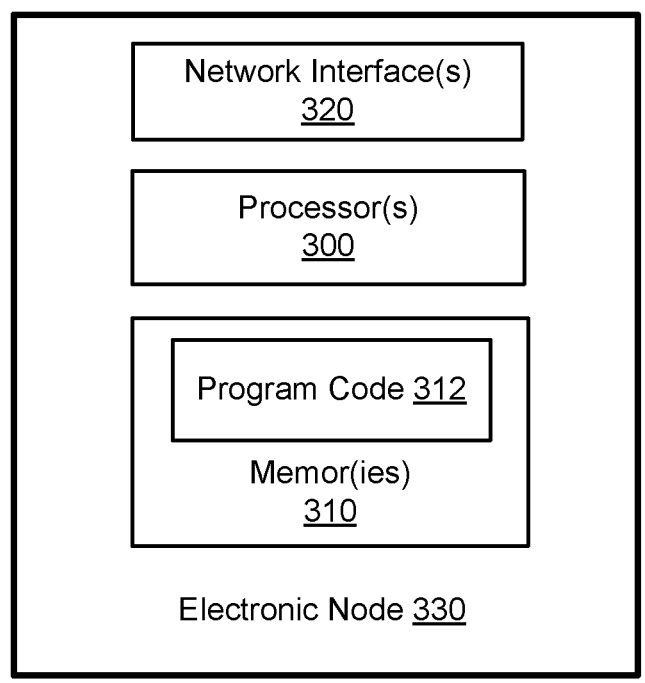
FIG. 3 is a block diagram of an electronic node of the communications system architecture of FIG. 1, such as an AMF, a CHF, and/or a SMF containing elements that are configured according to some embodiments of the present disclosure.

FIG. 3 is a block diagram of an electronic node 330 of the communications system architecture of FIG. 1, such as the AMF 110, the CHF 140, and/or the SMF 130 containing elements that are configured according to some embodiments. The electronic node 330 can include one or more network interfaces 320 (referred to as "network interface" for brevity), one or more processors 300 (referred to as "processor" for brevity), and one or more memories 310 (referred to as "memory" for brevity) containing program code 312.

The network interface 320 may be configured to communicate through a wired interface, e.g., Ethernet, and/or wireless interface, e.g., wireless transceiver, according to one or more proprietary protocols and/or industry standardized protocols, e.g., WiFi, 3GPP 4G, 5G (NR), etc. The processor 300 may include one or more data processing circuits, such as a general purpose and/or special purpose processor (e.g., microprocessor and/or digital signal processor) that may be collocated or distributed across one or more networks. The processor 300 is configured to execute program code 312 in the memory 310, described below as a computer readable medium, to perform some or all of the operations and methods that are described above for one or more of the embodiments of an AMF, a CHF, and/or a SMF, such as regarding one or more of the embodiments described herein in the context of FIGS. 1, 2, and 4-8.

The above and more general operations and methods that can be performed by an AMF, a SMF, and a CHF are now explained with reference to FIGS. 4-8.

Figure 4:
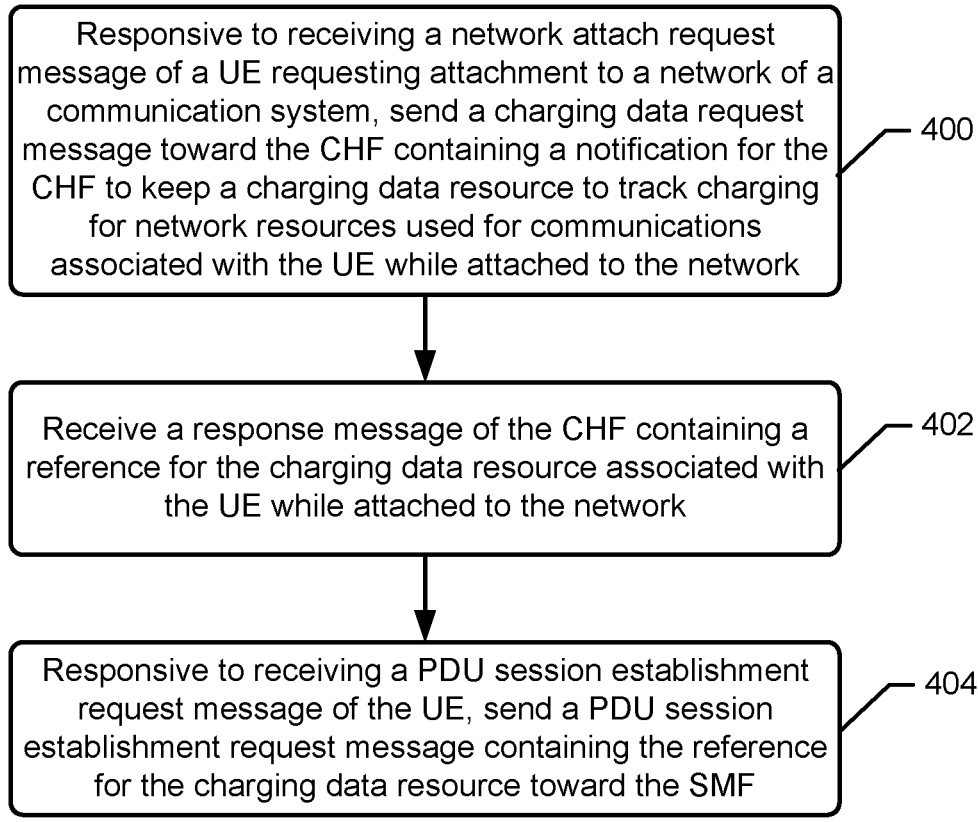
FIGS. 4 and 5 are flowcharts of operations by an AMF in accordance with some embodiments of the present disclosure.
Figure 5:
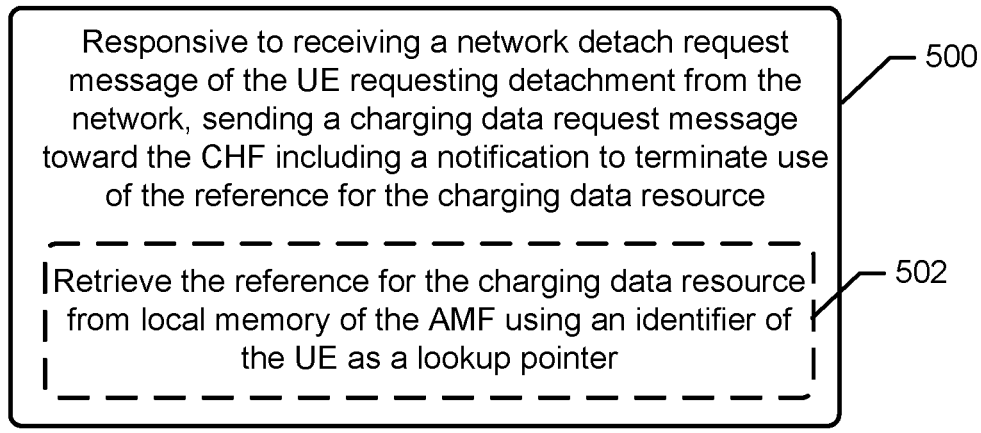

FIGS. 4 and 5 are flowcharts of operations by an AMF in accordance with some embodiments of the present disclosure.

Referring initially to FIG. 4, the AMF is configured to respond to receipt 200 of a network attach request message of a UE requesting attachment to a network of the communication system, by sending 400 (also 220 in FIG. 2) a charging data request message toward a CHF containing a notification for the CHF to keep a charging data resource to track charging for network resources used for communications associated with UE while attached to the network. The AMF receives 402 (also 204 in FIG. 2) a response message of the CHF containing a reference for the charging data resource associated with the UE while attached to the network. The AMF responds to receipt (208 in FIG. 2) of a PDU session establishment request message of the UE, by sending 404 (also 210 in FIG. 2) a PDU session establishment request message containing the reference for the charging data resource toward a session management plane function, SMF.

The reference for the charging data resource may be a Uniform Resource Identifier (URI) composed of a string of characters that unambiguously identifies a charging data resource record at the CHF which is used to track charging for network resources used for communications during one or more PDU sessions with the UE.

As was explained above, the same reference can be used for a series of PDU sessions with the UE. In a further related embodiment, the AMF responds to receiving another PDU session establishment request message of the UE, by sending another PDU session establishment request message containing the reference for the charging data resource toward the SMF. The PDU session establishment request message and the another PDU session establishment request message are received while the UE maintains attachment to the network without performing an intervening request to detach from the network.

Some further embodiments are directed to operations that occur when the UE requests to detach from the network. In the example embodiment of FIG. 5, the AMF responds to receiving (220 in FIG. 2) a network detach request message of the UE requesting detachment from the network, by sending 500 (also 222 in FIG. 2) a charging data request message toward the CHF including a notification to terminate use of the reference for the charging data resource. The operation to send 500 the charging data request message can include retrieving 502 the reference for the charging data resource from local memory of the AMF or connected memory (e.g., User Data Repository) using an identifier of the UE as a lookup pointer.

The AMF and/or another network function may forward the reference for the charging data resource to a Short Message Service Function (SMSF) and/or a Network Exposure Function (NEF).

Figure 6:
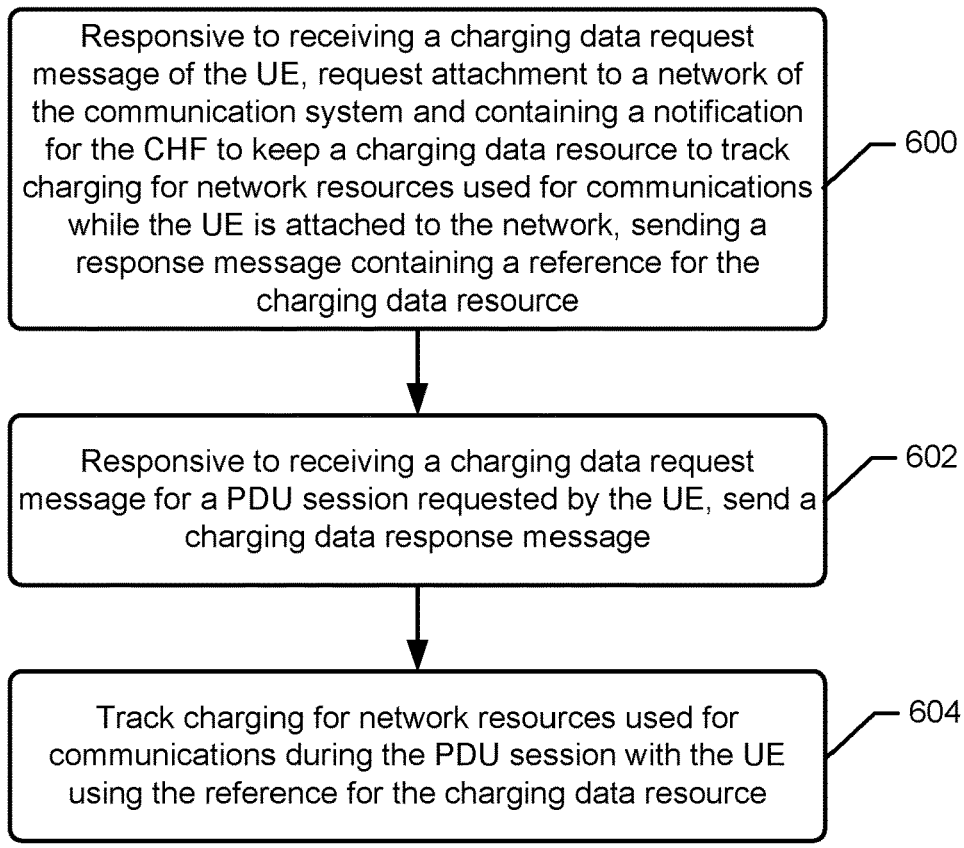
FIGS. 6 and 7 are flowcharts of operations by a CHF in accordance with some embodiments of the present disclosure.
Figure 7:
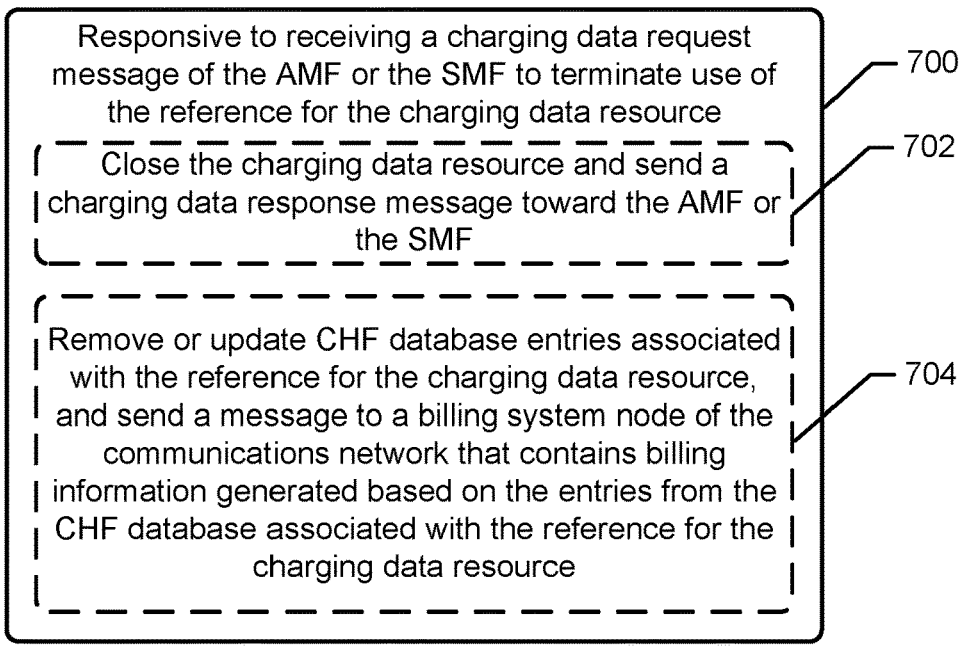

FIGS. 6 and 7 are flowcharts of operations by a CHF in accordance with some embodiments of the present disclosure.

Referring initially to FIG. 6, the CHF is configured to respond to receipt (202 in FIG. 2) of a charging data request message of a UE requesting attachment to a network of the communication system and containing a notification for the CHF to keep a charging data resource to track charging for network resources used for communications while the UE is attached to the network, by sending 600 (also 204 in FIG. 2) a response message containing a reference for the charging data resource;

The CHF responds to receipt (212 in FIG. 2) of a charging data request message for a PDU session requested by the UE, by sending 602 (also 214 in FIG. 2) a charging data response message. The CHF then tracks 604 charging for network resources used for communications during the PDU session with the UE using the reference for the charging data resource.

Again, the reference for the charging data resource may be a URI composed of a string of characters that unambiguously identifies a charging data resource record at the CHF which is used to track charging for network resources used for communications during one or more PDU sessions with the UE.

As was explained above, the same reference can be used for a series of PDU sessions with the UE. In a further related embodiment, the CHF is configured to respond to receipt of another charging data request message for another PDU session requested by the UE by sending another charging data response message, and tracking additional charging for additional network resources used for communications during the another PDU session with the UE using the reference for the charging data resource.

The charging data request for the PDU session and the another charging data request message for the another PDU session are received while the UE maintains attachment to the network without performing an intervening request to detach from the network.

The charging data response message may include the reference for the charging data resource. In one embodiment, the CHF embeds 602 (also 214 in FIG. 2) the reference for the charging data resource in the charging data response message sent by the CHF responsive to receiving (212 in FIG. 2) the charging data request for the PDU session requested by the UE.

Some further embodiments are directed to operations that occur when the UE requests to detach from the network. In the example embodiment of FIG. 7, the CHF responds to receipt (222 in FIG. 2) of a charging data request message of the AMF or the SMF to terminate use of the reference for the charging data resource, by closing the charging data resource and sending 702 (also 224 in FIG. 2) a charging data response message toward the AMF or the SMF.

The charging data request message may include the reference for the charging data resource.

The CHF may be configured to respond to receipt of a charging data request message of the AMF or the SMF to terminate use of the reference for the charging data resource, by removing or updating 704 its database entries associated with the reference for the charging data resource, and by sending 704 a message to a billing system node of the communications network that contains billing information generated based on the entries from the CHF database associated with the reference for the charging data resource.

Figure 8:
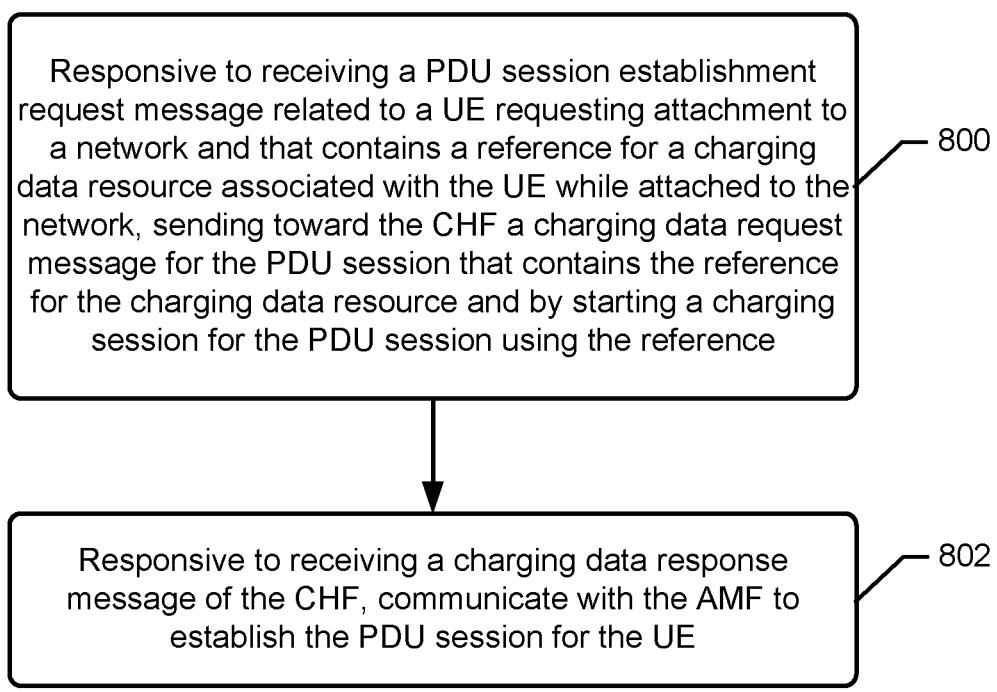
FIG. 8 is a flowchart of operations by a SMF in accordance with some embodiments of the present disclosure.

FIG. 8 is a flowchart of operations by a SMF in accordance with some embodiments of the present disclosure.

Referring to FIG. 8, the SMF is configured to respond to receipt (210 in FIG. 2) of a PDU session establishment request message related to a UE requesting attachment to a network of the communications system and that contains a reference for a charging data resource associated with the UE while attached to the network, by sending 800 (also 212 in FIG. 2) toward a CHF a charging data request message for the PDU session that contains the reference for the charging data resource and by starting a charging session for the PDU session using the reference. The SMF also responds to receipt (214 in FIG. 2) of a charging data response message of the CHF, by communicating 802 (also 216 in FIG. 2) with an AMF to establish the PDU session for the UE.

The communication 802 with the AMF to establish the PDU session for the UE may include sending a PDU session establishment message toward the AMF.

In some further embodiments, the charging data response message includes the reference. In one further embodiment, the SMF embeds the reference for the charging data resource in the PDU session establishment message sent by the SMF responsive to receiving the charging data response message of the CHF.

The reference for the charging data resource may be a URI composed of a string of characters that unambiguously identifies a charging data resource record at the CHF which is used to track charging for network resources used for communications during the PDU session with the UE.

The SMF may be further configured to forward the reference for the charging data resource to a SMSF and/or a NEF.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Various abbreviations used herein include the following:

Abbreviation Explanation
AMF Access Management Function
CHF Charging Function
IMSI International Mobile Subscriber Identity
PDU Protocol Data Unit
SMF Session Management Function
UE User Equipment
UPF User Plane Function

The invention claimed is:

1. A method by an access management function, AMF, of a communications system, the method comprising:
responsive to receiving a network attach request message of a user equipment, UE, requesting attachment to a network of the communication system, sending, from the AMF, a charging data request message toward a charging function, CHF, containing a notification for the CHF to keep a charging data resource to track charging for network resources used for communications associated with UE while attached to the network;
receiving, at the AMF, a response message of the CHF containing a reference for the charging data resource associated with the UE while attached to the network; and
responsive to receiving a protocol data unit, PDU, session establishment request message of the UE, sending, from the AMF, a PDU session establishment request message containing the reference for the charging data resource toward a session management plane function, SMF.

2. The method of claim 1, wherein the reference for the charging data resource is a Uniform Resource Identifier, URI, composed of a string of characters that unambiguously identifies a charging data resource record at the CHF which is used to track charging for network resources used for communications during one or more PDU sessions with the UE.

3. The method of claim 1, further comprising:
responsive to receiving another PDU session establishment request message of the UE, sending, from the AMF, another PDU session establishment request message containing the reference for the charging data resource toward the SMF.

4. The method of claim 3, wherein the PDU session establishment request message and the another PDU session establishment request message are received while the UE maintains attachment to the network without performing an intervening request to detach from the network.

5. The method of claim 1, further comprising:
responsive to receiving a network detach request message of the UE requesting detachment from the network, sending, from the AMF, a charging data request message toward the CHF including a notification to terminate use of the reference for the charging data resource.

6. The method of claim 5, wherein the sending of the charging data request message comprises retrieving the reference for the charging data resource from local memory of the AMF or connected memory, using an identifier of the UE as a lookup pointer.

7. The method of claim 1, further comprising:
forwarding the reference for the charging data resource to a Short Message Service Function, SMSF, or a Network Exposure Function, NEF.

8. A method by a charging function, CHF, of a communications system, the method comprising:
responsive to receiving a charging data request message of a user equipment, UE, requesting attachment to a network of the communication system and containing a notification for the CHF to keep a charging data resource to track charging for network resources used for communications while the UE is attached to the network, sending a response message containing a reference for the charging data resource toward an access management function, AMF;
responsive to receiving a charging data request message for a protocol data unit, PDU, session requested by the UE, sending a charging data response message; and
tracking charging for network resources used for communications during the PDU session with the UE using the reference for the charging data resource.

9. The method of claim 8, wherein the reference for the charging data resource is a Uniform Resource Identifier, URI, composed of a string of characters that unambiguously identifies a charging data resource record at the CHF which is used to track charging for network resources used for communications during one or more PDU sessions with the UE.

10. The method of claim 8, further comprising:
responsive to receiving another charging data request message for another PDU session requested by the UE, sending another charging data response message; and
tracking additional charging for additional network resources used for communications during the another PDU session with the UE using the reference for the charging data resource.

11. The method of claim 10, wherein the charging data request for the PDU session and the another charging data request message for the another PDU session are received while the UE maintains attachment to the network without performing an intervening request to detach from the network.

12. The method of claim 8, further comprising:
embedding the reference for the charging data resource in the charging data response message sent by the CHF responsive to receiving the charging data request for the PDU session requested by the UE.

13. The method of claim 8, further comprising:
responsive to receiving a charging data request message of the AMF or a session management plane function, SMF, to terminate use of the reference for the charging data resource, closing the charging data resource and sending a charging data response message toward the AMF or the SMF.

14. The method of claim 13, wherein the charging data request message comprises the reference for the charging data resource.

15. The method of claim 8, further comprising:
responsive to receiving a charging data request message of the AMF or the SMF to terminate use of the reference for the charging data resource, removing or updating database entries of a CHF database associated with the reference for the charging data resource, and sending a message to a billing system node of the communications network that contains billing information generated based on the entries from the CHF database associated with the reference for the charging data resource.

16. A method by a session management plane function, SMF, of a communications system, the method comprising:
responsive to receiving a protocol data unit, PDU, session establishment request message related to a user equipment, UE, requesting attachment to a network of the communications system and that contains a reference for a charging data resource associated with the UE while attached to the network, sending toward a charging function, CHF, a charging data request message for the PDU session that contains the reference for the charging data resource and by starting a charging session for the PDU session using the reference; and
responsive to receiving a charging data response message of the CHF, communicating with an access management function, AMF, to establish the PDU session for the UE comprising sending a PDU session establishment message toward the AMF, wherein the reference for the charging data resource is embedded in the PDU session establishment message.

17. An access management function, AMF, of a communications system comprising:
at least one processor; and
at least one memory coupled to the at least one processor and comprising computer readable program code that when executed by the at least one processor causes the at least one processor to perform operations configured to:
responsive to receiving a network attach request message of a user equipment, UE, requesting attachment to a network of the communication system, send, from the AMF, a charging data request message toward a charging function, CHF, containing a notification for the CHF to keep a charging data resource to track charging for network resources used for communications associated with UE while attached to the network;
receive, at the AMF, a response message of the CHF containing a reference for the charging data resource associated with the UE while attached to the network; and
responsive to receiving a protocol data unit, PDU, session establishment request message of the UE, send, from the AMF, a PDU session establishment request message containing the reference for the charging data resource toward a session management plane function, SMF.

18. The AMF of claim 17, wherein the computer readable program code when executed by the at least one processor further causes the at least one processor to perform operations configured to perform a method by an access management function, AMF, of a communications system, the method comprising:
  responsive to receiving a network attach request message of a user equipment, UE, requesting attachment to a network of the communication system, sending, from the AMF, a charging data request message toward a charging function, CHF, containing a notification for the CHF to keep a charging data resource to track charging for network resources used for communications associated with UE while attached to the network;
  receiving, at the AMF, a response message of the CHF containing a reference for the charging data resource associated with the UE while attached to the network;
  responsive to receiving a protocol data unit, PDU, session establishment request message of the UE, sending, from the AMF, a PDU session establishment request message containing the reference for the charging data resource toward a session management plane function, SMF,
  wherein the reference for the charging data resource is a Uniform Resource Identifier, URI, composed of a string of characters that unambiguously identifies a charging data resource record at the CHF which is used to track charging for network resources used for communications during one or more PDU sessions with the UE.

* * * * *